US010513352B2

(12) United States Patent
Poncet et al.

(10) Patent No.: US 10,513,352 B2
(45) Date of Patent: Dec. 24, 2019

(54) METHOD AND SYSTEM FOR TRANSFERRING A SATELLITE FROM AN INITIAL ORBIT INTO A MISSION ORBIT

(71) Applicant: AIRBUS DEFENCE AND SPACE SAS, Les Mureaux (FR)

(72) Inventors: Dominique Poncet, Toulouse (FR); Cyril Tourneur, Toulouse (FR); René Cheynet De Beaupre, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 337 days.

(21) Appl. No.: 15/501,168

(22) PCT Filed: Aug. 4, 2015

(86) PCT No.: PCT/EP2015/067971
§ 371 (c)(1),
(2) Date: Feb. 1, 2017

(87) PCT Pub. No.: WO2016/020390
PCT Pub. Date: Feb. 11, 2016

(65) Prior Publication Data
US 2018/0186476 A1 Jul. 5, 2018

(30) Foreign Application Priority Data

Aug. 5, 2014 (FR) .................................. 14 57614
Feb. 2, 2015 (FR) .................................. 15 50764

(51) Int. Cl.
*B64G 1/00* (2006.01)
*B64G 1/40* (2006.01)
(Continued)

(52) U.S. Cl.
CPC .......... *B64G 1/007* (2013.01); *B64G 1/1085* (2013.01); *B64G 1/402* (2013.01); *B64G 1/646* (2013.01); *B64G 1/405* (2013.01)

(58) Field of Classification Search
CPC .... B64G 1/007; B64G 1/1078; B64G 1/1085; B64G 1/1092; B64G 1/402; B64G 1/405
See application file for complete search history.

(56) References Cited

U.S. PATENT DOCUMENTS

6,669,148 B2 * 12/2003 Anderman ............. B64G 1/007
244/172.4
2005/0151022 A1 7/2005 D'Ausilio et al.
(Continued)

*Primary Examiner* — Nicholas McFall
(74) *Attorney, Agent, or Firm* — Im IP Law; C. Andrew Im; Chai Im (57) ABSTRACT

A system and method for transferring a satellite from an initial orbit into a mission orbit. The method includes anchoring to the satellite of an external unit having a tank containing a reserve of propellants. The system includes an autonomous spacecraft having an electric propulsion module and a small internal reserve of propellants, located in a parking orbit close to the initial orbit. The spacecraft with the external unit attached to the satellite is docked in an initial orbit, to produce a fluidic connection of the propellant tank of the external unit to the propulsion module of the spacecraft. The external unit and satellite is transferred into the mission orbit by the electric propulsion module of the spacecraft supplied with propellants directly from the external unit, thereby releasing the satellite into the mission orbit.

19 Claims, 4 Drawing Sheets

(51) Int. Cl.
*B64G 1/10* (2006.01)
*B64G 1/64* (2006.01)

(56) References Cited

U.S. PATENT DOCUMENTS

2009/0101757 A1    4/2009  Brandhorst, Jr.
2012/0000575 A1*   1/2012  Yandle .................... F16L 37/35
                                                          141/98
2017/0029138 A1*   2/2017  Bultel .................... B64G 1/007

* cited by examiner

METHOD AND SYSTEM FOR TRANSFERRING A SATELLITE FROM AN INITIAL ORBIT INTO A MISSION ORBIT

RELATED APPLICATIONS

This application is a § 371 application from PCT/EP2015/067971 filed Aug. 4, 2015, which claims priority from French Patent Application No. 14 57614 filed Aug. 5, 2014 and French Patent Application No. 15 50764 filed Feb. 2, 2015, each of which is incorporated herein by reference in its entirety.

FIELD OF THE INVENTION

The present invention lies in the field of stationing a space vehicle, more particularly a satellite, in its mission orbit around a celestial body. More particularly, the invention concerns a method of transfer of a satellite from an initial orbit to a mission orbit around a celestial body. The invention furthermore concerns a spacecraft for the implementing such a method, and an external propellant supply unit for implementing such a method, as well as a system comprising said spacecraft and said external supply unit. The invention also concerns an assemblage comprising said external supply unit and a satellite, as well as a method of control of a spacecraft for the implementing a transfer method according to the invention. The invention also concerns a more general method of positioning a satellite in its mission orbit around a celestial body, in particular from the Earth's surface.

BACKGROUND OF THE INVENTION

Space vehicles such as artificial satellites and other payloads, which shall be designated in the entire present description by the term "satellites", are intended to be stationed in orbit around a celestial body, in particular in Earth orbit, more particularly in geostationary orbit, in order to successfully carry out their mission, for example telecommunications, observation, and so forth. This stationing is usually carried out in two steps. The first step consists in launching the satellite into space, especially from the Earth's surface, by means of a vehicle specifically dedicated to this, commonly known as a launch vehicle, and injecting it into an initial orbit, known as the injection orbit. In the second step, the satellite is transferred from this injection orbit to its mission orbit, also known as the final orbit. Satellites are classically equipped with a propulsion system able to maintain them in the mission orbit, and then, if appropriate, at the end of their life, to transfer them into their graveyard orbit.

The transfer of the satellite from the initial orbit to the mission orbit for its part can also be accomplished by the satellite's own propulsion means. For this, the satellites may be equipped with propulsion systems comprising a chemical propulsion module with greater thrust to accomplish the transfer from the injection orbit to the mission orbit, and a chemical or electrical propulsion module of lower thrust for the orbital maintenance maneuvers.

In the most common instances, the injection orbit is a geostationary transfer orbit (GTO) and the satellite is transferred into geostationary orbit by one or more firings at the apogee of this GTO orbit by a dedicated chemical thruster.

Recently, electrical propulsion has also been used to accomplish such a transfer. This makes it possible to achieve better performance as compared to chemical propulsion. However, the lower thrust of the electrical propulsion results in longer transfer times. For the transfer phase, this therefore requires the satellite to be equipped with substantial thrust capabilities, which lead to major constraints on the dimensioning of the electrical propulsion system and the power system in order to obtain reasonable transfer times, that is, of the order of several months. These constraints have an unfavorable impact on the weight and the cost of the satellite.

It has otherwise been proposed by the prior art to implement, for the transfer of the satellite from its injection orbit to its mission orbit, an independent spacecraft able to dock to the satellite in the injection orbit and provided with means of propulsion making possible an orbit transfer. Such a spacecraft, described in particular in the document US 2005/0151022, is furthermore equipped with means enabling refilling of its tank with propellant, in orbit, from a service vehicle which has been positioned in said orbit for this purpose. However, the implementation of such a spacecraft is costly and onerous, especially because its resupply with propellant requires several steps which are complicated and time-consuming to accomplish.

OBJECT AND SUMMARY OF THE INVENTION

The present invention aims to remedy the drawbacks of the solutions proposed by the prior art to accomplish the transfer of a satellite from an initial orbit into a mission orbit around a celestial body, for example around the Earth, especially the drawbacks mentioned above, by proposing a simple and economical solution which allows accomplishing the orbit transfer quickly and with few steps.

For this purpose, it is proposed by the present inventors to implement, for accomplishing the orbit transfer of the satellite, a dedicated spacecraft, called transfer vehicle. This spacecraft is meant to be stationed between two missions in an orbit called parking orbit close to the initial orbit, and it is equipped with means of reversible connection to the satellite, and with means of electrical propulsion able to accomplish its orbit transfer, with the satellite which is connected to it, to the mission orbit of the latter. In a very advantageous manner, according to the present invention, such a spacecraft is supplied with propellant by an external supply unit which is launched into space joined to the satellite, such that the volume of propellant needed for the orbit transfer is brought to the spacecraft at the same time as the satellite, and used directly by the spacecraft to accomplish this transfer.

Thus, according to a first aspect, the invention concerns a method of transfer of a satellite from an initial orbit, particularly an injection orbit, to a mission orbit around a celestial body, especially an Earth orbit, and in particular a geostationary orbit. This method comprises, in said initial orbit, a step of docking:

of a spacecraft comprising an electrical propulsion module and a fluidic propellant supply circuit for supplying propellant to this propulsion module;

to an external propellant supply unit, comprising a propellant tank containing a reserve of propellant and anchored to the satellite by cooperating anchoring means carried respectively by the external unit and by the satellite.

The spacecraft and the external unit comprise cooperating docking means for reversible docking of one to the other, comprising means of fluidic connection of the propellant tank of the external unit with the fluidic circuit of the spacecraft such that the docking step realizes a fluidic connection between the fluidic circuit of the spacecraft and the propellant tank of the external unit, thus enabling the supply of propellant to the propulsion module from the external unit.

The method of transfer furthermore comprises the following subsequent steps:
- a step of transfer of the spacecraft so docked to an assemblage comprising the external unit anchored to the satellite to the mission orbit, by means of the electrical propulsion module of the spacecraft supplied with propellant from the propellant tank of the external unit, and
- a step of releasing the satellite into this mission orbit, or in proximity to the mission orbit, in the desired orbital position.

By the phrase "in proximity to the mission orbit" it is meant that the separation of the satellite and the spacecraft may be performed below the orbital mission arc of the satellite, yet sufficiently close to the latter that it is able to reach it, by one or more orbital correction maneuvers of low amplitude, for example requiring a Delta V less than 800 m/s, generally less than 400 m/s.

Thus, when the satellite is released in proximity to the mission orbit, it transfers to this mission orbit by its own means, typically by one or more thrust maneuvers tangential to the orbit, similar to the so-called east-west maneuvers for maintaining longitudinal position in a geostationary orbit. Advantageously, these maneuvers are done solely with the means of propulsion used for maintaining position.

By docking means for reversible docking, what is meant is docking means which can be released on command to bring about the separation of the spacecraft and the external unit.

In particular modes of implementing the invention, the mission orbit of the satellite is an Earth orbit, particularly the geostationary orbit. As for the initial orbit, this is then preferably a low Earth orbit.

The step of transfer from the initial orbit to the mission orbit can be carried out by any conventional trajectory, whether simple or sophisticated.

Preferably, the step of transfer is carried out so that it is as rapid as possible, and thus in particular to minimize the time of exposure of the satellite to the radiation of the Van Allen belts. For this purpose, it is highly advantageous in the context of the invention for the propulsion module of the spacecraft to have a substantial capacity for Delta V with high thrust, so as to achieve short transfer times, especially of around two months.

The method of transfer according to the invention can furthermore comply with one or more of the following characteristics, implemented separately or in any of their technically feasible combinations.

In particular modes of implementation of the invention, during the transfer step the spacecraft is supplied with propellant directly from the propellant tank of the external unit, that is, without going through any reservoir actually belonging to the spacecraft. Thus, in particular modes of implementation of the invention the fluidic circuit comprises a set of channels, valves, pumps, etc., but is free of any propellant reservoir.

In particular modes of implementation of the invention, the method comprises a previous rendezvous step, in the initial orbit, of the spacecraft with the assemblage comprising the external unit and the satellite, preferably at the side of the external unit. By a rendezvous step what is meant here is all phases of movement of the spacecraft and the assemblage formed by the satellite and the external unit that are necessary to and preceding the strictly speaking physical docking of the spacecraft to the external unit. For this rendezvous step, the approach trajectory of the spacecraft makes use of the general knowledge of the skilled person, especially as regards orbital rendezvous (RV) techniques, including knowledge of the dynamics of the assemblage formed by the satellite and the external unit. This step is preferably controlled from the ground.

In particular modes of implementation of the invention, the step of releasing the satellite into the mission orbit is accomplished by command for releasing the docking means docking the spacecraft to the external unit, this command being preferably transmitted by the spacecraft.

In variants of the invention, the anchoring means for anchoring the external unit to the satellite are of the type releasable on command to produce the separation of the external unit and the satellite, and the step of releasing the satellite into the mission orbit is accomplished by command for releasing the anchoring means anchoring the external unit to the satellite. Here again, this command is preferably transmitted by the spacecraft, via means of electrical connection of the spacecraft to the external unit, to the anchoring means anchoring the external unit to the satellite.

In particular modes of implementation of the invention, the method involves, after the step of releasing the satellite into the mission orbit, a step of moving the spacecraft to a graveyard orbit and of releasing the external unit into this graveyard orbit.

The method according to the invention can further involve, after the step of releasing the satellite into the mission orbit, and if necessary after the step of releasing the external unit into a graveyard orbit, a step of moving the spacecraft to a so-called parking orbit. This parking orbit is preferably situated in proximity to the initial orbit of the next satellite whose the spacecraft will be tasked with accomplishing the transfer, by implementing a method of transfer according to the invention. This step of return of the spacecraft to a parking orbit can be slow, so as to minimize the consumption of propellant needed for its performance.

In particular modes of implementation of the invention, the spacecraft comprises a propellant reservoir in fluidic connection with the fluidic circuit, and the method involves, between the docking step and the transfer step, a step of transfer of propellant from the propellant tank of the external unit to the propellant reservoir of the spacecraft.

When the propellant contained in the propellant tank of the external unit is of gaseous type, this step of transfer of propellant from the propellant tank of the external unit to the propellant reservoir of the spacecraft is preferably accomplished by fluidic connection of the propellant tank and the propellant reservoir, preferably via the fluidic circuit, so as to allow the transfer of propellant by equilibration of pressures between the propellant tank and the propellant reservoir.

Insofar as, during the docking of the spacecraft to the external unit, the propellant tank of the latter contains gaseous propellant, while the propellant reservoir of the spacecraft is substantially empty, such an equilibration of pressures occurs spontaneously, in the direction of a refilling of the propellant reservoir of the spacecraft with a portion of the propellant initially contained in the propellant tank of the external unit. The propellant thus transferred spontaneously to the reservoir of the spacecraft constitutes a reserve for the latter, making it possible to supply the electrical propulsion module after separation of the spacecraft and the external unit, so that the spacecraft is advantageously autonomous for the entire phase of return from the mission orbit, or where appropriate from the graveyard orbit, to its parking orbit.

Thus, in preferred modes of implementation of the invention, the fluidic circuit of the spacecraft comprises sealing means able to move between a closure position, preventing the circulation of fluid in the fluidic circuit between the propellant reservoir and the propulsion module, and an opening position enabling this circulation of fluid, and means of actuating these sealing means between the closure position and the opening position. The method according to the invention then involves, after the step of releasing the satellite into the mission orbit, and where appropriate after a step of separation of the spacecraft and the external unit in a graveyard orbit, a step of actuating these sealing means for sealing the fluidic circuit, so as to enable the circulation of fluid from the propellant reservoir of the spacecraft to the propulsion module of the spacecraft, and thus the supply of propellant to this propulsion module directly from the propellant reservoir of the spacecraft.

The spacecraft according to the invention can also comprise a propulsion system of the cold gas type, advantageously using the same propellant as the electrical propulsion module. This cold gas propulsion system can utilize the same propellant reservoir as that utilized by the electrical propulsion module, or a specific propellant reservoir. In the latter case, the specific reservoir is advantageously placed in the fluidic circuit of the spacecraft so as to be supplied before the reservoir utilized by the electric propulsion module, so as to maximize the pressure there. This proves to be particularly advantageous when the cold gas propulsion system is utilized for the rendezvous maneuvers, in order to obtain better performance.

The method according to the invention likewise applies to the simultaneous transfer of a plurality of satellites, all of them anchored to the external unit, from the initial orbit to their respective mission orbits. The releasing of these satellites is then preferably effected at the same time, into an orbit situated in proximity to each of these mission orbits, each satellite then being transferred to its own mission orbit by its own means, for example, by one or more thrust maneuvers tangential to the orbit, in particular when the satellites are destined to be positioned in the same orbit.

Otherwise, the method may comprise a succession of steps of:
  releasing a satellite or several satellites into their mission orbit,
  then transfer to the mission orbit of the following satellite or satellites, by means of the electrical propulsion module of the spacecraft supplied with propellant from the propellant tank of the external unit,
  releasing this satellite or these satellites into their mission orbit,
  etc.

For this purpose, provision is advantageously made according to the invention for the external unit to possibly comprise anchoring means for simultaneous anchoring to said plurality of satellites, each of said satellites comprising cooperating anchoring means.

In particular, the present invention applies to configurations in which the external unit is anchored to each of the satellites through a dispenser, or any other element of similar function. Thus, the phrase external unit in the present description encompasses "external unit—dispenser" composites in which the anchoring means for anchoring to the satellite(s) are carried by the dispenser, and the docking means for docking to the spacecraft according to the invention are carried by the external unit itself.

Dispensers are elements well known to the skilled person, utilized in a manner classical in itself for the launching of groupings of identical satellites by means of the same launch vehicle. They comprise, primarily, means of reversible anchoring to the satellites, means of releasing the satellites, such as of pyrotechnical kind, and an interface for connection with the launch vehicle.

According to the invention, this connection interface of the dispenser is advantageously utilized to provide the anchoring, which is preferably reversible, and the electrical connection of the dispenser, not to the launch vehicle, but to the external unit, which itself comprises the interface of connection to the launch vehicle.

The method of transfer according to the invention then comprises the same steps as those described above, each satellite of the plurality of satellites being, in the last step, released from the dispenser into its mission orbit or in proximity to its mission orbit, in the manner classical in itself. As for the dispenser, this remains attached to the external unit.

In particular modes of implementation of the invention, the method involves, after the step of releasing the satellites into the mission orbit, a step of moving the spacecraft to an orbit in which the risks of future collisions are minimized, such as a graveyard orbit, or an orbit enabling a re-entry in the medium term, according to the current standards and regulations. In this orbit, the method according to the invention thus preferably provides a step of releasing either the dispenser alone, or the dispenser and the external unit connected to it.

Advantageously, the means of control in the dispenser are reduced to a minimum, and the dispenser has no need for any autonomy, since it performs no maneuver itself, other than the ejecting of the satellites to which it is anchored.

According to another aspect, the present invention concerns a method of remote control of a spacecraft for the carrying out of the steps of a method of transfer according to the invention, corresponding to one or more of the characteristics given above or hereafter, more particularly of a spacecraft comprising an electrical propulsion module, a fluidic propellant supply circuit for supplying propellant to this propulsion module, and docking means for reversible docking to an external propellant supply unit, comprising means of fluidic connection of this external unit to the fluidic circuit enabling the supply of propellant to the propulsion module from the external unit.

According to this method, the spacecraft is remotely controlled by a control unit, in particular on the ground, control signals being successively determined and sent to the spacecraft by this control unit to carry out the steps of the method of transfer according to the invention.

Another aspect of the invention concerns a control unit comprising means configured to control, preferably remotely, especially from the Earth's surface, a spacecraft for the carrying out of a method of transfer according to the invention, corresponding to one or more of the characteristics given above or hereafter.

The present invention also concerns a computer program product comprising a set of program code instructions which, when executed by a processor, implement a method of remote control according to the invention.

According to another aspect, the present invention concerns a spacecraft, called transfer vehicle, for carrying out a method of transfer according to the invention.

This spacecraft comprises:
an electrical propulsion module,
a fluidic propellant supply circuit for supplying propellant to the propulsion module, and
a propellant reservoir, in fluidic connection with the fluidic circuit.

It furthermore comprises docking means for reversible docking of the spacecraft to an external propellant supply unit, that is, means that are releasable on command to bring about the separation of the spacecraft and the external propellant supply unit; the latter is launched attached to the satellite whose orbital transfer must be carried out. These reversible docking means comprise means of fluidic connection of the fluidic circuit to the external unit. The fluidic circuit is furthermore configured to allow:
the direct supplying of propellant to the propulsion module from the external unit, that is, without this propellant having to pass through the propellant reservoir of the spacecraft, and
a fluidic connection between the propellant reservoir and the external unit.

The electrical propulsion module of the spacecraft is advantageously configured to be able to realize the desired orbital transfer of the set formed by the spacecraft, the external unit, and the satellite, preferably in a relatively reduced time.

The spacecraft is thus advantageously configured so that the fluidic connection, by the means of fluidic connection, of the fluidic supply circuit of the electrical propulsion module with the external unit allows for the supplying of propellant to the propulsion module directly from this external unit, that is, without going through the reservoir of the spacecraft.

The spacecraft furthermore comprises its own propellant reservoir, and means of fluidic connection of this reservoir and the electrical propulsion module, via the fluidic circuit, by a pathway at least partly distinct from the supply pathway of the electrical propulsion module from the means of fluidic connection to the external unit.

In particular embodiments, the spacecraft according to the invention furthermore corresponds to the following characteristics, implemented separately or in any of their technically feasible combinations.

Preferably, the propellant reservoir is dimensioned to enable the propellant supply of the spacecraft to accomplish only the following operations: the transfer of the spacecraft, optionally docked to the external unit substantially empty of propellant, from the mission orbit of the satellite to a parking orbit near the injection orbit of the satellite; the maintaining of the spacecraft in this parking orbit; the transfer of the spacecraft from this parking orbit to the injection orbit of the satellite, up to a point of rendezvous with the latter; as well as, if applicable, the preliminary transfer of the spacecraft docked to the external unit substantially empty of propellant from the mission orbit of the satellite to a graveyard orbit in which the external unit is intended to be released. In particular, the propellant reservoir of the spacecraft is not dimensioned to enable the propellant supply of the spacecraft to accomplish the transfer of the set, formed by the spacecraft, the external unit and the satellite, from the initial orbit to the mission orbit of the satellite.

The determination of the internal propellant holding volume of the reservoir making it possible to comply with such characteristics lies within the competence of the skilled person, who for this purpose will take into account in particular the characteristics of the propulsion module, the weight of the spacecraft, and the orbits between which the transfer has to take place.

In particular embodiments of the invention, the fluidic circuit comprises sealing means able to move between a closure position, preventing the circulation of fluid in the fluidic circuit between the propellant reservoir and the propulsion module, and an opening position enabling this circulation of fluid, as well as means of actuating these sealing means between the closure position and the opening position.

These sealing means can be formed in particular by the combination of a first valve type member having a closure position and an opening position, and a second member of antireturn flap type, disposed on two branches of the fluidic circuit at the exit from the propellant reservoir of the spacecraft. The means of actuating the sealing means can then consist of means of driving the valve to open or close.

Such a configuration advantageously makes it possible to control the propellant circulation from the reservoir of the spacecraft to the propulsion module, and consequently to control the phases during which the propulsion module is supplied with propellant by the specific propellant reservoir of the spacecraft, and those when it is not.

The fluidic circuit can furthermore comprise a sealing member, such as of the antireturn flap type, enabling the circulation of fluid from the means of fluidic connection to the propellant reservoir, and preventing the passage of fluid from the propellant reservoir to the means of fluidic connection to the external unit. When the spacecraft is fluidically connected to the external unit, such a sealing member advantageously allows the circulation of propellant from the external unit to the propellant reservoir of the spacecraft, but not the reverse, particularly after the transfer of propellant to the reservoir.

In particular embodiments of the invention, the fluidic supply circuit of the spacecraft comprises a branch called a supply branch, connecting the means of fluidic connection and the propulsion module, and a diversion branch of this supply branch, fluidically connected to the propulsion module of the spacecraft. The propellant reservoir is in fluidic connection with this diversion branch.

In such a configuration, the sealing means able to allow or prevent the circulation of fluid in the fluidic circuit between the propellant reservoir and the propulsion module can be arranged on this diversion branch.

The spacecraft can also comprise a cold gas propulsion system, advantageously using the same propellant as the electrical propulsion. This cold gas propulsion system can utilize the same reservoir as that utilized by the electrical propulsion module of the spacecraft, or else a specific reservoir which can be connected to the diversion branch of the fluidic supply circuit of the spacecraft.

In particular embodiments of the invention, the spacecraft comprises means of rendezvous, preferably of the semiautomatic type, with the external unit located in the initial orbit. These means of rendezvous are classical in themselves. For this purpose, the spacecraft comprises in particular means of performing proximity operations, such as rear view mirrors, video camera, and/or laser, especially for the realization of the final closed loop of the rendezvous maneuver.

During the rendezvous phase, the spacecraft can advantageously utilize its cold gas propulsion system, if it is provided with such a system.

According to one advantageous characteristic of the invention, the spacecraft comprises means of electrical connection to the external unit. These means of electrical connection are configured in particular to transmit control signals coming from the spacecraft to the external unit.

The docking means for docking to the external unit can be of any type classical in itself. Means not generating debris upon their release are especially preferred in the context of the invention. Preferably, these docking means are furthermore chosen to generate low levels of impact so as not to affect the flight performance of the satellite equipment. The docking means are, for example, of the mechanical, magnetic or electromagnetic type, well known to the skilled person.

Besides means of mechanical and/or (electro)magnetic connection, and means of electrical and fluidic connection to the external supply unit, the docking means can likewise comprise means of communication connection to this external unit.

The electrical propulsion module of the spacecraft is configured to be able to control its attitude and orbit for all the operations associated with the transfer of the satellite attached to the external unit from the initial orbit to the mission orbit, and its return for a later mission.

Preferably, the electrical propulsion module comprises high-thrust thrusters, enabling a rapid transfer from the initial orbit to the mission orbit of the satellite. Such thrusters can be in particular of the Hall effect type, well known to the skilled person.

The electrical propulsion module may then likewise comprise supplemental thrusters of lower thrust and stronger specific impulse, which can be used for a return phase of the spacecraft to the parking orbit. During this return phase, the thrust can be lower, since the weight being transferred is smaller. Moreover, it can be slower, since in particular there is no longer any operational constraint associated with the satellite. These thrusters can in particular be of the ionic grid type, well known to the skilled person.

The high-thrust thrusters, not operated during this phase, could be used in a larger number of missions, for the same service life. In such a configuration, the overall propellant consumption is also advantageously reduced.

The low-thrust thrusters can be arranged on the same surface of the spacecraft as the high-thrust thrusters, or on a different surface. In particular, the low-thrust thrusters can be arranged on the surface of the spacecraft comprising the docking means for docking to the external unit, while the high-thrust thrusters are arranged on a different surface, especially an opposite one. The surface comprising the docking means then becomes usable after the releasing of the external unit, with an unobstructed visual field. Such a configuration advantageously limits the interference of the thrust jets with the external unit and the satellite.

In variants of the invention, the electrical propulsion module may comprise thrusters with variable thrust and specific impulse, enabling an operation with strong thrust and low specific impulse on the one hand, and with low thrust and strong specific impulse on the other hand, such as the thrusters using the Elwing technology.

The spacecraft constitutes a fully autonomous vehicle, comprising its own means of communication, in particular, with a remote command module, especially one on the ground, its own maneuvering means, etc. It can be launched into space at the same time as the satellite, or prior thereto. It can advantageously be used for several missions in succession.

Another aspect of the invention concerns an external unit for implementing a method of transfer according to the invention, for the supply of propellant to a spacecraft according to the invention.

This external unit comprises a propellant tank, as well as:
anchoring means for anchoring to a satellite, situated in a first zone of the external unit, and
docking means able to cooperate with reversible docking means of a spacecraft, situated in a second zone of the external unit and comprising means of fluidic connection of the propellant tank to the spacecraft.

The propellant tank is advantageously dimensioned to enable the supply of propellant to the propulsion module of the spacecraft to perform all of the following operations: the transfer of the spacecraft, docked to the external unit, itself secured to the satellite, from the initial orbit to the mission orbit of the satellite; the transfer of the spacecraft docked to the external supply unit from the mission orbit of the satellite to a graveyard orbit for the external unit; the transfer of the spacecraft, optionally docked to the external unit, to a parking orbit near the injection orbit of the satellite; the maintaining of the spacecraft in this parking orbit; and the transfer of the spacecraft from this parking orbit to the injection orbit of the satellite, up to a point of rendezvous with the latter.

The determination of the internal propellant holding volume of the propellant tank of the external unit making it possible to perform these operations lies within the competence of the skilled person, who for this purpose will take into account in particular the characteristics of the propulsion module, the weight of the spacecraft, the external unit and the satellite, and the orbits between which the transfer has to take place.

The external unit can furthermore meet the following characteristics, taken separately or in any of their technically feasible combinations.

In particular embodiments of the invention, the anchoring means for anchoring of the external unit to the satellite are of the type releasable on command to bring about the separation of the external unit and the satellite. These means are preferably chosen to not generate debris upon their release. Such a characteristic advantageously allows a limiting of the weight of the satellite at its station. The surface of the satellite thus released moreover becomes usable for other purposes.

In particular embodiments of the invention, the external unit comprises means of electrical connection to the spacecraft. The releasing of the anchoring means for anchoring to the satellite is then preferably slaved to these means of electrical connection, such that this releasing can be advantageously controlled from the spacecraft. The satellite thus remains purely passive until its release into its mission orbit, which simplifies the interfaces with the spacecraft and the costs for adaptation.

The external unit furthermore preferably comprises passive means of rendezvous with the spacecraft, meant to cooperate with the active means of rendezvous carried by the latter. These means of rendezvous are well known to the skilled person.

In particular embodiments of the invention, the external unit comprises anchoring means for simultaneous anchoring to a plurality of satellites, comprising for example a dispenser, as explained above.

According to another aspect, the present invention concerns an assemblage comprising an external unit according to the invention, in which the propellant tank contains propellant for electrical propulsion, and a satellite comprising anchoring means able to cooperate with the anchoring means of the external unit. This external unit is secured in reversible manner to the satellite by cooperation of the anchoring means of the satellite and the anchoring means of the external unit.

The satellite can be classical in itself. In particular, it may comprise payloads, means of collecting solar energy, in the form of solar panels, generally being deployable, means of communication utilizing antennas with deployable reflectors, and a service module, providing its basic functions, and comprising in particular systems for electrical power supply, control and navigation, telemetry and communication, etc., as well as the associated electrical wiring. It also comprises means of propulsion and a propellant reserve sufficient for the orbital maintenance maneuvers in order to correct the position of the satellite in its mission orbit, and if necessary for orbit change maneuvers for its transfer, at the end of its life, to its graveyard orbit. All of these elements are well known to the skilled person and shall not be described in further detail in the present description. According to the invention, the specific means of propulsion and propellant reserve of the satellite are configured in particular to be unable to provide for an orbital transfer of the satellite from the initial orbit to its mission orbit, so that the weight and volume which they occupy are advantageously limited.

Aboard the satellite, the anchoring means for anchoring with the external unit are preferably disposed in the area of the surface normally used to provide the interface with the launch vehicle, so that the anchoring of the external unit on the satellite advantageously does not require any major modifications to the latter.

The satellite and the external unit are moreover preferably configured so that their cooperating anchoring means also provide an electrical and communication connection. The external unit furthermore preferably comprises means which allow it, when on the one hand docked to the spacecraft according to the invention and on the other hand anchored to the satellite, to constitute a communication interface between the satellite and the spacecraft. Thus, the control of the satellite is possible from a control unit, especially a remote control unit, of the spacecraft. The satellite can thus remain advantageously passive until released into its mission orbit, while still being controllable prior to this release.

In particular embodiments of the invention, the external unit comprising anchoring means for simultaneous anchoring to a plurality of satellites, comprising in particular a dispenser, said assemblage comprises a plurality of satellites each comprising anchoring means able to cooperate with the anchoring means of the external unit, this external unit being secured, in reversible manner, to each of these satellites by cooperation of the anchoring means of the satellite and the anchoring means of the external unit, which are for example carried by the dispenser.

Another aspect of the present invention concerns a system for the transfer of a satellite from an initial orbit to a mission orbit around a celestial body, especially an Earth orbit, in particular a geostationary one, comprising a spacecraft according to the invention and an external unit according to the invention.

In this system, the external unit can be secured to the satellite whose transfer must be carried out. The external unit may itself be docked with the spacecraft, concomitantly or not.

Thus, the system according to the invention can in particular have any one of the following configurations, in which the following different components are joined to each other: spacecraft docked to the external unit secured to the satellite; spacecraft docked to the external unit not secured to the satellite.

In particular embodiments of the invention, this system may moreover comprise a control unit, especially a remote control unit, comprising means configured to control the spacecraft, by transmission of successive command signals to said spacecraft, to carry out the steps of the method according to the invention of transfer of the satellite from the initial orbit to the mission orbit, as well as preferably the set of ancillary operations carried out by the spacecraft to allow its return to station in the parking orbit awaiting its next mission.

The control unit, especially a ground control unit, is classical in itself and may comprise one or more antennas for receiving signals from the spacecraft and sending instruction signals to the latter. It may comprise computers and means of processing and storing the data received from the spacecraft. The latter is preferably equipped in particular with a command module, in particular comprising one or more processors, slaved to a communication module cooperating with the control unit.

According to another aspect, the present invention concerns a method of positioning a satellite in its mission orbit around a celestial body, particularly an Earth orbit, especially a geostationary orbit, which involves the steps of:
  attachment to the satellite of an external unit according to the invention, and introduction of propellant for electrical propulsion into the propellant tank of this external unit, so as to form an assemblage according to the invention; these two steps being able to be carried out in any given order;
  launching this assemblage into space, especially from the Earth's surface, and injection into an initial orbit around the celestial body; and
  carrying out a method of transfer according to the invention, to realize the transfer of this assemblage from the initial orbit to the mission orbit.

The launching into space can be realized by means of any launch vehicle which is classical in itself, in particular one comprising means of propulsion and means of guidance able to ensure its launching from the Earth and the injection of the assemblage comprising the satellite and the external unit into the initial orbit, generally into a low Earth orbit.

In particular embodiments of the invention, the external unit is attached to a plurality of satellites, for example by means of a dispenser which it comprises for this purpose, so that said plurality of satellites are launched at the same time, by means of the same launch vehicle.

In preferred embodiments of the invention, the method of positioning the satellite in its mission orbit involves the placing in orbit of a spacecraft according to the invention in a so-called parking orbit around said celestial body, preferably situated in proximity to the initial orbit or in this initial orbit. This placing in orbit can be effected at the same time as the launching and the injection of the satellite into the initial orbit, by means of the same launch vehicle, or it can be done previously, by another launch vehicle.

By all its aspects, the present invention advantageously enables major cost savings to be made when performing operations of positioning a plurality of satellites in their mission orbits. This is due in particular to the fact that the spacecraft can be used for many successive missions, the propellant needed for the supplying of its electrical propulsion module, in order to perform one complete mission, being entirely brought along with the satellite, moreover in an external unit detachable from the latter upon command. The weight gain as compared to the conventional systems implementing a chemical orbital transfer is moreover substantial. As compared to an electrical transfer, the invention furthermore advantageously enables a reduction in the time of transfer of the satellite from the initial orbit to the mission orbit, especially by virtue of a suitable configuration of the electrical propulsion module of the spacecraft, which also results in a major cost saving for the satellite operators. Finally, the gain provided by the present invention is also measured in terms of simplification of the satellite, as compared to the classical systems providing an orbital transfer realized by the satellite's own means, resulting here again in further weight and cost savings for the satellite, as well as the costs associated with its launching.

BRIEF DESCRIPTION OF THE DRAWINGS

The characteristics and advantages of the invention will appear more clearly in light of the following example embodiments and modes of implementation, provided merely as an illustration and in no way limiting the invention, supported by FIGS. 1 to 5, in which.

DETAILED DESCRIPTION OF THE EMBODIMENTS

In the following description, for greater convenience the invention shall be described with reference to a launch configuration of a satellite from the Earth's surface, for a stationing in a geostationary mission orbit (GEO) realized in two steps, involving a first step of injection of the satellite into an initial low Earth orbit (LEO). However, the invention is in no way limited to such a configuration, and it likewise applies in similar fashion to all other combinations of launch surface, initial orbit and mission orbit.

A system according to the invention for the positioning of a satellite 10 in its mission orbit involves the following different components: an external unit 20, a spacecraft 30, which shall be called hereinafter the transfer vehicle, and a control unit of the spacecraft 50.

Figure 5:
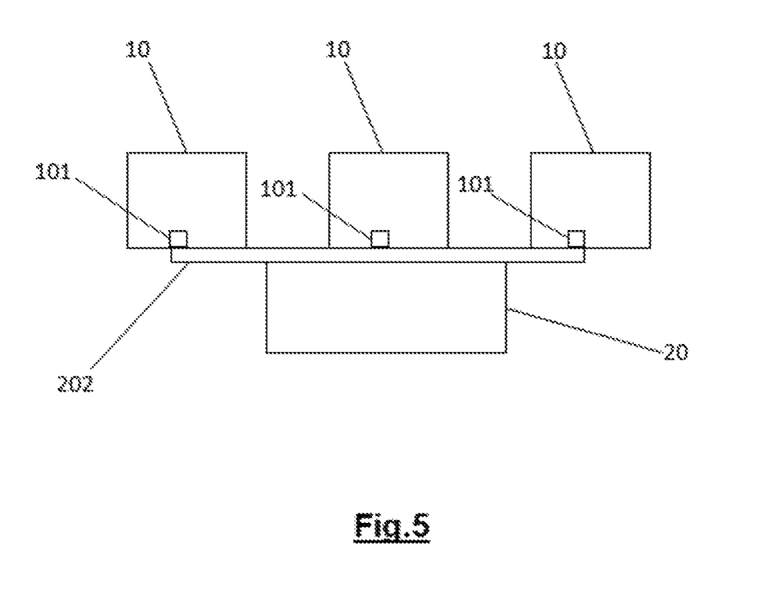
FIG. 5 represents schematically an external unit according to the invention, attached to a plurality of satellites.

In the following description the case will be taken of the stationing of a single satellite, it being understood that this teaching is directly transposable to the stationing of a plurality of satellites 10 launched at the same time by the same launch vehicle, and all anchored to the same external unit 20. The external unit 20 thus comprises for this purpose anchoring means (anchor 202) for reversible anchoring to each of said plurality of satellites 10, as shown in FIG. 5, and means of releasing each of these satellites. These means of releasing can be actuatable both jointly and separately, so that by choice the satellites can be released either at the same time into the same orbit, or successively into different orbits.

Schematically, the external unit 20 is designed to be secured to the satellite 10 on the Earth's surface, in order to form an assemblage intended to be injected into the LEO orbit. As for the transfer vehicle 30, this is designed to take over this assemblage in the LEO orbit, in order to carry out its transfer to the GEO orbit. The transfer vehicle, after having released the external unit 20 into a graveyard orbit, if applicable, is intended to return to station in a so-called parking orbit, in proximity to the LEO orbit, for the purpose of taking over a new assemblage comprised of a new satellite and a new external unit, to be transferred in turn to the GEO orbit (or another mission orbit).

Figure 1:
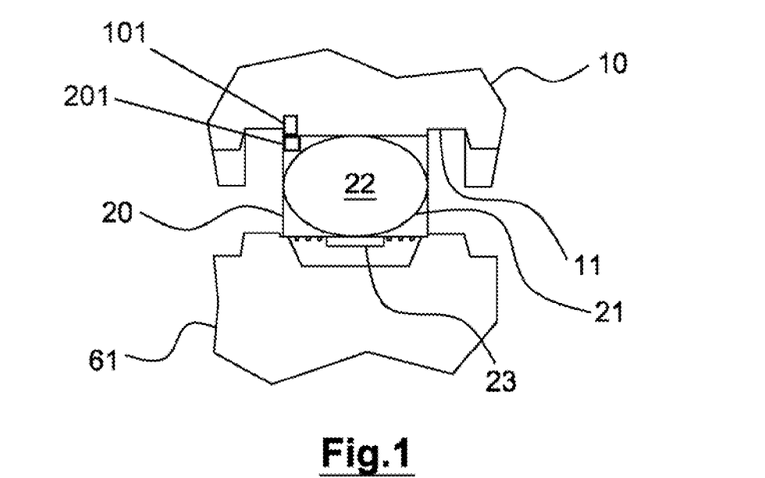
FIG. 1 represents schematically an external unit according to the invention, attached on the one hand to a satellite and on the other hand to a launch vehicle, in launch configuration.

The satellite 10, shown schematically in FIG. 1, is classical in itself. In the area of its surface 11 normally intended to form an interface with a launch vehicle, this satellite 10 is provided with anchoring means (anchor 101) for anchoring to the external unit 20. The external unit 20 comprises for this purpose cooperating anchoring means (anchor 201). These anchoring means can be of any type customarily used in the field of space travel. In particular, they can be pyrotechnical devices, magnetic or electromagnetic coupling means, or mechanical rings, such as the so-called "cup and cone" system, pyrotechnical bolts or mechanisms of "clamp-band" type currently used in the area of satellite/launcher interfaces. Such anchoring systems are well known to the skilled person.

The anchoring means for anchoring the external unit 20 to the satellite 10 are configured in particular to realize, besides a mechanical connection, an electrical and communication connection between these two elements.

The external unit 20 itself comprises means of reversible fixation, not visible in FIG. 1, to a launch vehicle 61. This launch vehicle 61 is classical in itself and adapted to realize, from Earth, the injection of the assemblage formed by the satellite 10 and the external unit 20 into the LEO orbit.

In FIG. 1, the satellite 10, the external unit 20 and the launch vehicle 61 are shown attached to each other, in a configuration for launching into space.

The external unit 20 comprises a propellant tank 21, adapted to receive a volume 22 of propellant in the form of a gas, such as xenon.

It moreover comprises docking means for reversible docking to the transfer vehicle 30, able to cooperate with cooperating docking means carried by the latter, and preferably arranged in the area of a surface of the external unit 20 opposite the surface where the anchoring means for anchoring to the satellite 10 are arranged.

Figure 2:
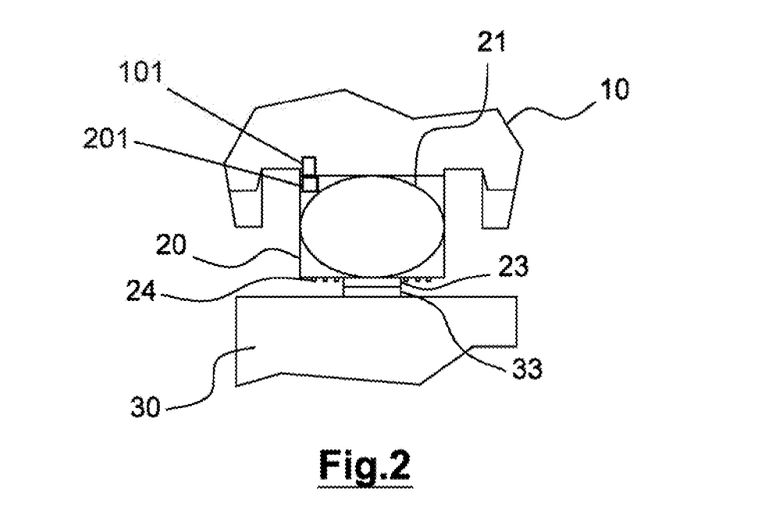
FIG. 2 represents schematically an external unit according to the invention, attached on the one hand to a satellite and on the other hand to a spacecraft according to the invention.

FIG. 2 shows schematically the satellite 10 attached to the external unit 20, itself attached to the transfer vehicle 30, in a so-called transfer configuration.

The cooperating docking means of the external unit 20 and the transfer vehicle 30 can be of any type known in themselves to the skilled person, enabling a reversible docking. These docking means are for example of the mechanical, magnetic or electromagnetic type. They comprise a first means 23 disposed on the external unit 20 and a second means 33 disposed on the spacecraft 30, able to cooperate and ensure the docking in reversible manner, and illustrated schematically in FIG. 2.

The transfer vehicle 30 comprises means of rendezvous with the external unit 20 which are classical in themselves. The external unit 20 comprises cooperating passive means of rendezvous, also classical in themselves, and comprising for example a series of light-emitting diodes 24, whose signal is used by the spacecraft 30 to realize the approach and coupling maneuvers.

The transfer vehicle 30 constitutes an autonomous space vehicle. In particular, it comprises an electrical propulsion module 37, a fluidic propellant supply circuit 39 for supplying propellant to this propulsion module 37, means of communication, especially with a remote control unit 50, especially on the ground, means of maneuvering, etc. It can also comprise a propellant reservoir 35.

Besides the means of electromagnetic connection, the docking means of the transfer vehicle 30 and of the external unit 20 likewise comprise means of electrical and communication connection. In particular, the external unit 20 is configured so as to constitute an interface between the spacecraft 30 and the satellite 10, to allow the transmission of signals from one to the other. Moreover, the anchoring means for anchoring the external unit 20 to the satellite 10 are slaved to the means of electrical connection between the external unit 20 and the transfer vehicle 30, so that the releasing of the satellite 10 can be controlled from the transfer vehicle 30.

The docking means for docking the transfer vehicle 30 and the external unit 20 also comprise means of fluidic connection to each other, more precisely between the tank 21 of the external unit 20 and the fluidic propellant supply circuit 39 of the propulsion module 37 of the transfer vehicle 30.

Figure 3:
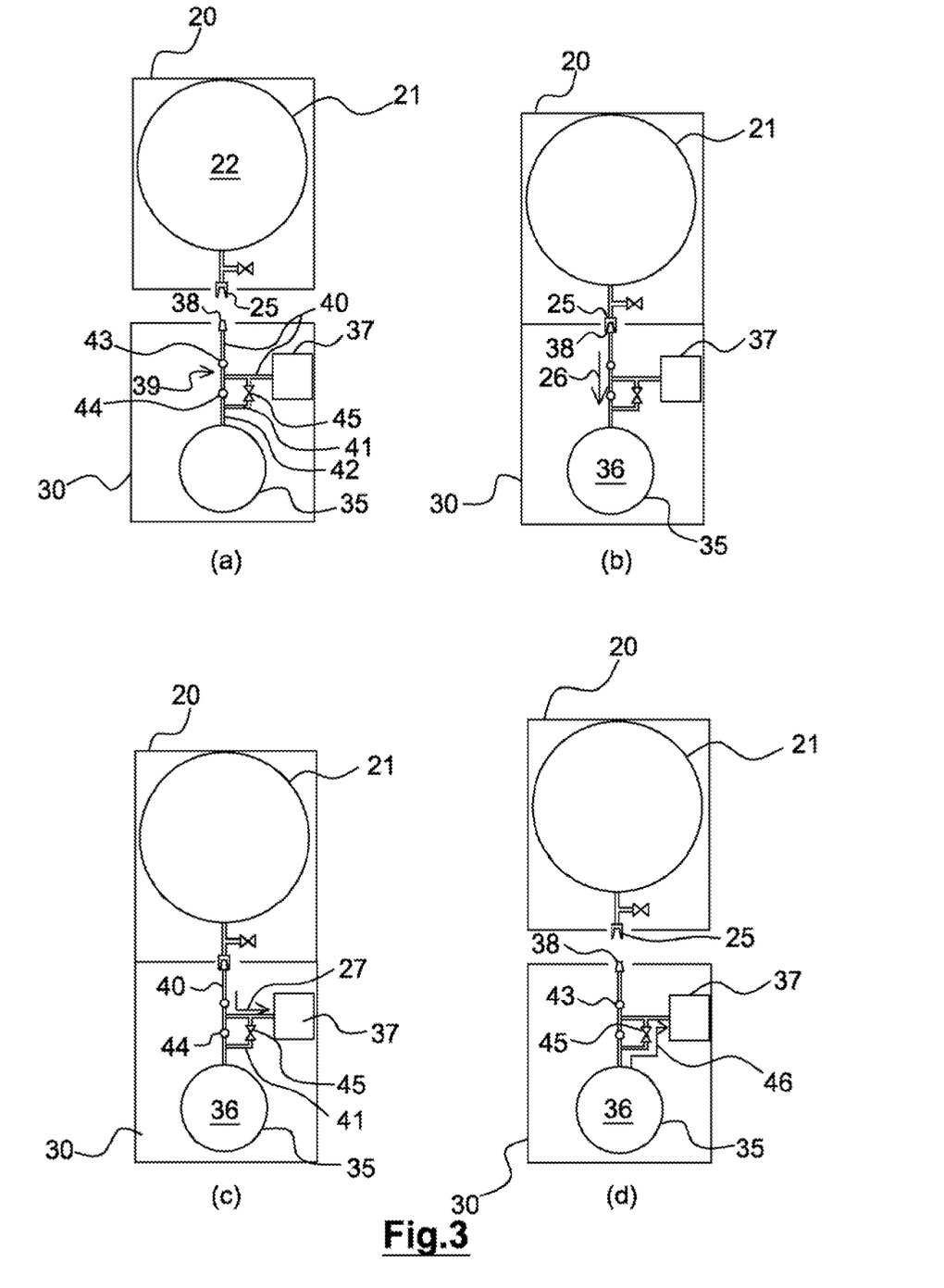
FIG. 3 illustrates schematically the fluidic connection between an external unit and a spacecraft according to the invention, as well as different configurations for circulation of fluid within said spacecraft.

These means of fluidic connection, as well as the fluidic circuit 39 of the transfer vehicle 30, are illustrated schematically in FIG. 3. This figure also illustrates the different configurations of fluid circulation from the external unit 20, and within the transfer vehicle 30.

The propellant tank 21 of the external unit 20 is dimensioned to contain a volume of propellant 22 adapted to the supplying of the electrical propulsion module 37 of the spacecraft 30 to carry out the following phases: transfer of the system composed of the transfer vehicle 30, the external unit 20 and the satellite 10 from the injection orbit LEO to the mission orbit GEO of the satellite; transfer of the system composed of the transfer vehicle 30 and the external unit 20 from this mission orbit GEO to a graveyard orbit for the external unit 20; return of the transfer vehicle 30 to a parking orbit close to the initial orbit; maintaining of the transfer vehicle 30 in the parking orbit; transfer of the transfer vehicle 30 to the initial orbit, to take over a new satellite whose stationing has to be carried out.

The propellant reservoir 35 of the transfer vehicle 30 for its part is dimensioned to contain a volume of propellant 36 adapted to the supplying of the electrical propulsion module 37 of the transfer vehicle 30 for the performance of the following phases: return of the transfer vehicle 30, from the graveyard orbit of the external unit 20, to a parking orbit near the initial orbit; maintaining of the transfer vehicle 30 in the parking orbit; transfer of the transfer vehicle 30 to the initial orbit, for taking over a new satellite whose stationing has to be carried out.

In an initial configuration, illustrated in (a) in FIG. 3, the propellant tank 21 of the external unit 20 is filled with propellant, and the propellant reservoir 35 of the transfer vehicle is substantially empty. This configuration corresponds to a phase of rendezvous, in the initial orbit, of the transfer vehicle 30 and the external unit 20.

The external unit 20 comprises means 25 of fluidic connection of the propellant tank 21 with the transfer vehicle 30. The transfer vehicle 30 comprises cooperating means 38 of fluidic connection of the external unit 20 to the fluidic propellant supply circuit 39 for supplying propellant to the electrical propulsion module 37.

This fluidic circuit 39 comprises a so-called supply branch 40, connecting the means of fluidic connection 38 and the electrical propulsion module 37. In FIG. 3, this branch forms a right angle.

The fluidic circuit 39 furthermore comprises a diversion branch 41, extending between two points of the supply branch 40. The propellant reservoir 35 is connected to this diversion branch 41 by a channel 42.

On the fluidic circuit 39 there are mounted two antireturn flaps which enable the circulation of fluid from the means of fluidic connection 38 to the reservoir 35, yet prevent any circulation of fluid in the opposite direction. A first antireturn flap 43 is mounted on the supply branch 40, upstream of the diversion branch 41 in the direction of circulation of the fluid coming from the fluidic connection means 38. A second antireturn flap 44 is mounted on the diversion branch 41, upstream of the branching point of the channel 42, in the direction of circulation of the fluid coming from the means of fluidic connection 38.

The fluidic circuit 39 also comprises a valve 45, actuatable to open and close, especially a pyro-valve, mounted on the diversion branch 41, so as to be able to seal the latter in the position of closure, downstream from the branching point of the channel 42, in the direction of circulation of the fluid coming from the reservoir 35 and going to the electrical propulsion module 37. The transfer vehicle comprises means to control the opening and the closure of the valve 45.

In the initial configuration illustrated in (a) of FIG. 3, the valve 45 is in the closed position.

During the docking of the transfer vehicle 30 to the external unit 20, as illustrated in (b) of FIG. 3, the fluidic connection is established between the means of fluidic connection 25 of the external unit 20 and the means of fluidic connection 38 of the transfer vehicle 30. The tank 21 and the reservoir 35 are then in fluidic connection with each other. By a spontaneous equilibration of their internal pressures, and owing to the substantial difference in internal volumes of the tank 21 on the one hand and the reservoir 35 on the other, a transfer of propellant then occurs from the tank 21 to the reservoir 35, as indicated at 26 in the figure, resulting in a filling of the reservoir by a volume of propellant 36 substantially corresponding to its maximum capacity. The pressure after the transfer remains elevated in the tank 21. Such a configuration of the external unit 20 and the transfer vehicle 30 advantageously makes it possible to dispense with the use of costly, heavy and complicated equipment, such as pumps, to realize the transfer of propellant from the tank 21 of the external unit 20 to the reservoir 35 of the transfer vehicle 30.

In particular embodiments of the invention, the spacecraft 30 furthermore comprises a cold gas propulsion system, and a specific reservoir different from the reservoir 35 used by the electrical propulsion module 37, known as the main reservoir (elements not shown in the figures). This specific reservoir is advantageously arranged in the spacecraft 30 so that it can be supplied before the main reservoir 35, in order to maximize the pressure therein and thereby maximize the specific impulse of the cold gas propulsion system, which proves to be advantageous as compared to the use of a joint reservoir when the cold gas propulsion is implemented primarily during the rendezvous phase.

During the phase of transfer from the LEO orbit to the GEO orbit, the electrical propulsion module 37 of the transfer vehicle 30 draws from the propellant reserves available to it. The valve 45 being always closed, and the antireturn flap 44 being operating, its supplying is accomplished directly and solely from the tank 21 of the external unit 20, via the supply branch 40, as indicated at 27, in (c) of FIG. 3. The quantity of propellant contained in the tank 21 allows it perform the transfer to the GEO orbit and then from there to the graveyard orbit of the external unit 20.

When the external unit 20 is released by the transfer vehicle 30, as illustrated in (d) of FIG. 3, the means of fluidic connection 25 and 38 are disconnected from each other. The reservoir 35 contains a substantially maximum volume of propellant 36. In order to ensure the supply of propellant to the electrical propulsion module 37, the valve 45 is actuated to open, so as to allow the circulation of fluid from the reservoir 35 toward the electrical propulsion module 37, as indicated at 46 in FIG. 3. The antireturn flap 43 prevents any return of fluid to the means of fluidic connection 38.

The electrical propulsion module 37 of the transfer vehicle 30 comprises a plurality of thrusters, chosen to provide a strong thrust. For example, these thrusters have a power of 20 kW each.

The propulsion module 37 is preferably configured such that these strong-thrust thrusters are located in the area of one surface of the transfer vehicle 30, distinct from the surface containing the docking means for docking to the external unit 20, for example opposite to this surface.

These thrusters can have variable thrust and specific impulse, enabling an operation with strong thrust/weak specific impulse or weak thrust/strong specific impulse, such as the thrusters using the Elwing technology.

In variants of the invention, the thrusters with strong thrust and weak specific impulse are associated with thrusters of weak thrust and strong specific impulse, for the implementing of operations of movement of the transfer vehicle 30 after separation from the satellite 10. These supplemental thrusters can be disposed in the same zone of the transfer vehicle 30 as the thrusters of strong thrust 47, or preferably in a distinct zone.

The system according to the invention furthermore comprises a remote control unit 50, configured to drive the different phases carried out by the transfer vehicle 30. For this purpose, the control unit 50 and the transfer vehicle 30 each comprise conventional remote communication means.

The control unit 50 is adapted to determine control signals which are sent to the transfer vehicle 30. These control signals are determined, for example, as a function of measurement signals received from the transfer vehicle 30, which are determined by different sensors (gyroscope, star tracker, etc.) of the latter.

The control unit 50 comprises for example at least one processor and at least one electronic memory in which a computer program product is stored, in the form of a set of program code instructions to be executed in order to carry out the different steps of a method of control of the transfer vehicle 30. In one variant, the control unit 50 likewise comprises a programmable logic circuit or circuits of FPGA, PLD, etc., type and/or specialized integrated circuits (ASICs) adapted to carry out some or all of said steps of the method of control. In other words, the control unit 50 comprises a set of means configured in software (specific computer program product) and/or hardware (FPGA, PLD, ASIC, etc.) mode to carry out the different steps of a method of control as described below.

The different steps of a method of positioning the satellite 10 in its mission orbit GEO 62, from the Earth's surface 60, by means of the system as described above, are illustrated in FIG. 4.

In a first step of the method, implemented at the Earth's surface 60, the satellite 10, comprising means of propulsion dimensioned solely to be able to ensure its maintaining in position in its mission orbit, such as a geostationary orbit, is attached to the external unit 20, by their cooperating anchoring means. This anchoring realizes a mechanical, electrical and communication connection between these two elements. The propellant tank 21 is filled with a volume 22 of gaseous propellant, such as xenon, and attached to the launch vehicle 61, shown in exploded view in FIG. 4.

Figure 4:
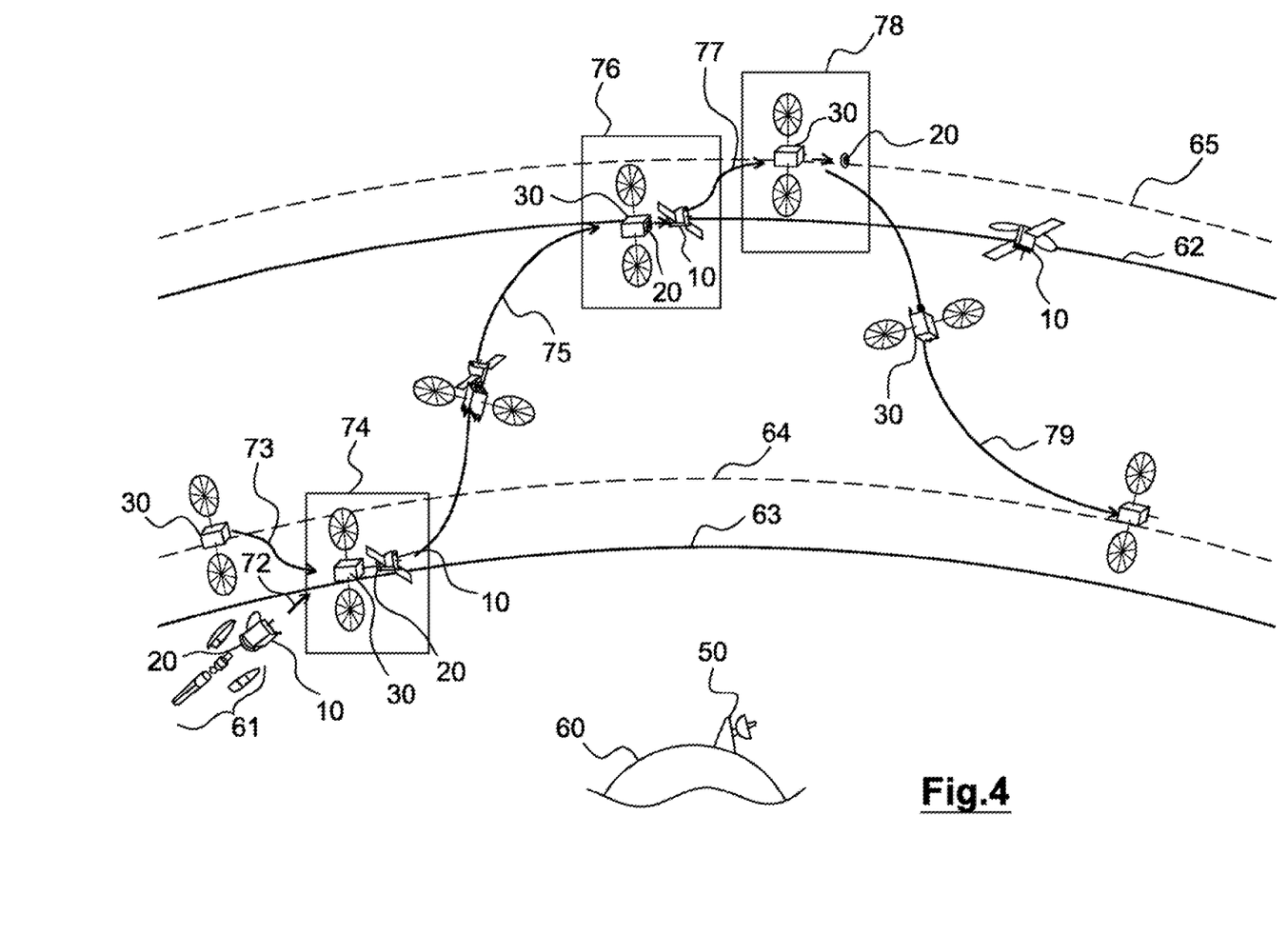
FIG. 4 illustrates schematically the different steps of a method of positioning a satellite in its mission orbit, according to a particular embodiment of the invention.

In a subsequent step, the assemblage comprising the satellite 10 and the external unit 20 is launched from the Earth's surface 60 and injected, by the launch vehicle 61, into the LEO orbit 63, as illustrated at 72 in FIG. 4.

The transfer vehicle 30 has been previously placed in orbit, in conventional manner, in an Earth orbit called a parking orbit 64, near the LEO orbit 63. Its orbital maintenance in this orbit is ensured by its propulsion module 37, and a small quantity of propellant contained in its propellant reservoir 35.

After the injection of the satellite 10 and the external unit 20 into the LEO orbit 63, the method of positioning the satellite provides for the controlling of the transfer vehicle 30, by the remote control unit 50 situated for example on the Earth's surface 60, to carry out the following successive phases.

In a first phase, indicated at 73 in FIG. 4, the transfer vehicle performs a change of orbit, moving into the LEO orbit 63. Here it carries out rendezvous operations with the external unit 20, in a manner conventional per se. For this purpose, the external unit 20 moves into the adequate orbital position.

In a second phase 74, still in the LEO orbit 63, the spacecraft 30 docks with the external unit 20, by the cooperating docking means carried respectively by the spacecraft 30 and the external unit 20. This docking produces, between these two elements, a fluidic, pneumatic, electrical and communication connection. In particular, it produces a fluidic connection between the propellant tank 21 of the external unit 20 and the fluidic propellant supply circuit 39 for supplying propellant to the electrical propulsion module 37 of the transfer vehicle 30.

After realizing this fluidic connection, a transfer of propellant is carried out by spontaneous equilibration of pressures between the tank 21 of the external unit 20 and the reservoir 35 of the transfer vehicle 30. Once the transfer is finished, the following phase 75 is carried out.

This phase 75 consists in a transfer of the system formed by the transfer vehicle 30, the external unit 20 and the satellite 10 from the LEO orbit 63 to the mission orbit GEO 62. This transfer is realized by propulsion by means of the propulsion module 37 of the transfer vehicle 30, supplied with propellant directly from the tank 21 of the external unit 20. It is rapid, by virtue of the advantageous characteristics of the electrical propulsion module 37. The time of exposure of the satellite 10 to the radiation of the Van Allen belts is consequently reduced.

The transfer vehicle 30 then controls the releasing of the anchoring means anchoring the external unit 20 to the satellite 10, for the injection of the latter into the GEO orbit 62.

In one variant of the invention, it is the assemblage composed of the external unit 20 and the satellite 10, joined to each other, which is injected into the GEO orbit 62 by the transfer vehicle 30, which then continues its mission alone.

During all these phases, the satellite 10 has remained passive, in particular its means of telecommunication remaining non-deployed. However, its control from the control unit 50 has been made possible via the transfer vehicle 30, and the external unit 20 forming an interface for the transmission of signals between the latter and the satellite 10. The satellite 10 in particular can be configured such that the releasing of its anchoring means for anchoring to the external unit 20 automatically triggers its placement in service.

In certain cases, it may be advantageous during one or more of these phases to deploy the solar panels of the satellite, in order to boost the power available for the transfer vehicle 30. Then the satellite is no longer passive. In particular embodiments of the invention, the spacecraft 30, the external unit 20 and the satellite 10 are provided for this purpose with means of transmission of power between the satellite 10 and the spacecraft 30.

From the GEO orbit 62, the next phase 77 may consist in a transfer of the transfer vehicle 30, still docked to the external unit 20, to a graveyard orbit 65. In this graveyard orbit 65, the transfer vehicle 30 is controlled to release the docking means for docking to the external unit 20, as indicated at 78 in FIG. 4, so as to release the external unit 20 there. The graveyard orbit 65 may be situated above or below the GEO orbit 62. When the graveyard orbit 65 is located below the geostationary arc, this operation does not require additional Delta V.

During all of these phases of transfer from the LEO orbit 63, the supplying of propellant to the electrical propulsion module 37 of the transfer vehicle 30 has been done directly from the propellant tank 21 of the external unit 20. After or at the moment of separation of the external unit 20 and the transfer vehicle 30, the valve 45 of the latter is opened, so as to establish a fluidic connection between the propellant reservoir 35 and the electrical propulsion module 37 of the transfer vehicle 30. The latter then becomes entirely autonomous, and begins to use its own reserve of propellant, formed just after the implementing of the phase 74 of docking to the external unit 20.

In a later phase 79, the transfer vehicle 30 is then taken back to its parking orbit 64. This orbital transfer is preferably performed with a low thrust, so as not to consume much propellant. The transfer vehicle 30 is maintained in this parking orbit 64 until its next mission.

In variants of the invention, less advantageous than those described above in terms of complexity of the transfer vehicle 30 equipment, after the phase 76 of releasing the satellite 10 in the mission orbit 62 the transfer vehicle 30 is brought directly to the parking orbit 64, still docked to the external unit 20. In its next mission, it docks to a new assemblage formed by a satellite to be stationed attached to an external supply unit carrying its own reserve of propellant. After the positioning of this new satellite in its mission orbit, the transfer vehicle 30 returns to the graveyard orbit 65, to release there the external unit 20, empty of propellant, from the previous mission. Thus, the transfer vehicle is always docked to an external unit, which supplies it with propellant for all its maneuvers. In such a context, the transfer vehicle 30 need no longer have its own propellant reservoir 35.

As an example, the dimensioning of the system according to the invention and the orbital transfer parameters can be as follows.

The Delta V for the transfer from the LEO orbit 63 to the GEO orbit 62 is 4549 m/s, and the Delta V for the transfer from the GEO orbit 62 to the graveyard orbit 65 is 11 m/s.

The dry weights are 3000 kg for the transfer vehicle 30, 2500 kg for the satellite 10 and 100 kg for the external supply unit 20. The transfer vehicle 30 uses 5 thrusters, each of 20 kW, providing a total thrust of 7.2 N in Hall effect technology, with a specific impulse of 2000 s, and 5 thrusters of 20 kW with a total thrust of 3.2 N in ionic grid technology, with a specific impulse of 4500 s. To provide redundancy in the event of a failure, and compensate for engine wear, a total of 10 thrusters for each technology has been taken into account in the weight balance sheet.

The propellant used is xenon. The useful volume of the propellant tank 21 of the external unit 20 is 821 l. The initial pressure in this propellant tank filled with propellant is 250 bar.

The useful volume of the propellant reservoir 35 of the transfer vehicle 30 is 174 l. The initial pressure in this reservoir, prior to docking with the external unit 20, is 10 bar.

After docking and pressure equilibration, the pressure in each of the tank 21 and the reservoir 35 is 208 bar.

The specific impulse during the phase of transfer of the satellite from the LEO orbit 63 to the GEO orbit 62 is 2000 s, and the specific impulse during the phases of transfer from the GEO orbit 62 to the graveyard orbit 65 and the return to the parking orbit 64 is 4500 s.

The weight of propellant used to carry out the transfer of the satellite 10 to the GEO orbit 62, and then the transfer of the transfer vehicle 30 and the external unit 20 to the graveyard orbit 65, is 1542 kg.

The residual weight of propellant in the external unit 20 after its release in the graveyard orbit 65 is 78 kg.

The weight of propellant used for the return of the transfer vehicle 30 to its parking orbit 64 is 327 kg.

The residual weight of propellant in the reservoir 35 of the transfer vehicle 30 after its return to the parking orbit is 17 kg.

By comparison, for a classical launching solution, consisting in launching the satellite into a GTO transfer orbit, for the same dry weight as in this example of implementation of the method according to the invention, the weight launched in the GTO orbit would be 3950 kg with a chemical propulsion system (specific impulse of 320 s) and 2700 kg with an electrical propulsion system (specific impulse of 1750 s).

The gain provided by the present invention differs in the two instances. In the first case, it substantially translates into a gain in the capacity of the launch vehicle, since the latter needs to provide 150 GJ for the case with transfer according to the invention, compared to 215 GJ for a classical chemical transfer. In the second case, there is a significant gain in the duration of the transfer (around 6 months for the classical launch solution with electrical transfer, compared to around 2 months according to the present invention), and consequently in the operating costs and the financial costs for satellite amortization, as well as the radiation dose to which the satellite is exposed (this reduction represents between 30 and 80% of the absorbed dose, depending on the case).

The invention claimed is:

1. A method of transferring a satellite from an initial orbit to a mission orbit of the satellite around a celestial body, comprising the steps of:

in the initial orbit, docking a spacecraft to an external propellant supply unit, the spacecraft comprising an electrical propulsion module and a fluidic propellant supply circuit to supply a propellant to the electrical propulsion module, the external propellant supply unit comprising a propellant tank containing a reserve of the propellant and the external propellant supply unit is being anchored to the satellite by anchors which cooperate and which are carried respectively by the external propellant supply unit and the satellite;

wherein the spacecraft and the external propellant supply unit comprise docking units which cooperate to reversibly dock with each other, the docking units comprising fluidic connectors to provide a fluidic connection between the propellant tank and the fluidic propellant supply circuit to supply the propellant to the electrical propulsion module from the external propellant supply unit during the docking step;

moving the spacecraft docked to an assemblage comprising the external propellant supply unit anchored to the satellite, to the mission orbit of the satellite by the electrical propulsion module of the spacecraft supplied with the propellant from the propellant tank of the external propellant supply unit;

releasing the satellite into the mission orbit; and wherein during the moving step, the electrical propulsion module of the spacecraft is supplied with the propellant directly from the propellant tank of the external propellant supply unit, without going through any reservoir belonging to the spacecraft.

2. The method as claimed in claim 1, further comprising a rendezvous step of the spacecraft rendezvousing with the assemblage in the initial orbit.

3. The method as claimed in claim 1, wherein the anchors are releasable on a command to produce a separation of the external propellant supply unit and the satellite; and wherein the step of releasing the satellite into the mission orbit is accomplished by the command to release the anchors to separate the external propellant supply unit and the satellite from each other.

4. The method as claimed in claim 1, wherein the spacecraft comprises a propellant reservoir in a fluidic connection with the fluidic propellant supply circuit; and further comprising, between the docking step and the moving step, a transferring step of transferring the propellant from the propellant tank of the external propellant supply unit to the propellant reservoir of the spacecraft.

5. The method as claimed in claim 4, wherein the propellant contained in the propellant tank of the external propellant supply unit is of a gaseous type; and wherein the transferring step transfers the propellant via a fluidic connection between the propellant tank and the propellant reservoir by an equilibration of pressures between the propellant tank and the propellant reservoir.

6. The method as claimed in claim 1, further comprising, after the step of releasing the satellite into the mission orbit, a step of moving the spacecraft to a parking orbit.

7. A method of remotely controlling a spacecraft for performing the steps of the transfer method as claimed in claim 1, comprising steps of remotely controlling the spacecraft by a control unit; successively determining and transmitting control signals to the spacecraft by the control unit to perform the steps of the transfer method.

8. A spacecraft, comprising:
an electrical propulsion module;
a fluidic propellant supply circuit to supply a propellant to the electrical propulsion module;
a propellant reservoir in a fluidic connection with the fluidic propellant supply circuit;
a docking unit to reversibly dock the spacecraft to an external propellant supply unit, and comprising a fluidic connector to provide a fluidic connection between the fluidic propellant supply circuit and the external propellant supply unit; and
wherein the fluidic propellant supply circuit is configured to supply the propellant directly to the electrical propulsion module from the external propellant supply unit, without passing through the propellant reservoir of the spacecraft, and to establish a fluidic connection between the propellant reservoir and the external propellant supply unit.

9. The spacecraft as claimed in claim 8, wherein the fluidic propellant supply circuit comprises a sealing member configured to move between a closure position, preventing circulation of a fluid in the fluidic propellant supply circuit between the propellant reservoir and the electrical propulsion module, and an opening position enabling the circulation of the fluid; and an actuator to actuate the sealing member between the closure position and the opening position.

10. The spacecraft as claimed in claim 8, wherein the fluidic propellant supply circuit comprises a sealing member enabling a passage of a fluid from the fluidic connector to the propellant reservoir and preventing the passage of the fluid from the propellant reservoir to the fluidic connector.

11. The spacecraft as claimed in claim 8, further comprising a system to rendezvous with the external propellant supply unit located in the initial orbit.

12. The spacecraft as claimed in claim 8, further comprising an electrical connector to establish an electrical connection between the spacecraft and the external propellant supply unit.

13. An assemblage, comprising:
an external propellant supply unit comprising:
a propellant tank;
an anchor to anchor the external propellant supply unit to a satellite, said anchor being situated in a first zone of the external propellant supply unit; and
a docking unit configured to cooperate with a cooperating docking unit of a spacecraft to reversibly dock with each other, said docking unit being situated in a second zone of the external propellant supply unit and comprising a fluidic connector to provide the fluidic connection between the propellant tank and the spacecraft;
wherein the anchor of the external propellant supply unit is releasable on a command to produce a separation of the external propellant supply unit and the satellite, wherein the external propellant supply unit further comprises an electrical connector to establish an electrical connection between the external propellant supply unit and the spacecraft and wherein the release of the anchor for anchoring the external propellant supply unit to the satellite is slaved to the electrical connector such that the release of the anchor is controllable from the spacecraft;
wherein the propellant tank of the external propellant supply unit contains the propellant for an electrical propulsion;
the satellite comprising an anchor configured to cooperate with the anchor of the external propellant supply unit; and
wherein the external propellant supply unit is secured, in a reversible manner, to the satellite by a cooperation of the anchor of the satellite and the anchor of the external propellant supply unit.

14. The assemblage as claimed in claim 13, further comprising a plurality of satellites; wherein the anchor of the external propellant supply unit is configured to simultaneously anchor the external propellant supply unit to said plurality of satellites, each satellite comprises an anchor configured to cooperate with the anchor of the external propellant supply unit, and the external propellant supply unit is secured, in the reversible manner, to each satellite by the cooperation of the anchor of said each satellite and the anchor of the external propellant supply unit.

15. A method of positioning a satellite in a mission orbit around a celestial body, comprising the steps of:
forming an assemblage comprising:
an external propellant supply unit comprising:
a propellant tank;
an anchor to anchor the external propellant supply unit to a satellite, said anchor being situated in a first zone of the external propellant supply unit; and
a docking unit configured to cooperate with a cooperating docking unit of a spacecraft to reversibly dock with each other, said docking unit being situated in a second zone of the external propellant supply unit and comprising a fluidic connector to provide the fluidic connection between the propellant tank and the spacecraft, wherein the propellant tank of the external propellant supply unit contains the propellant for an electrical propulsion; and
the satellite comprising an anchor configured to cooperate with the anchor of the external propellant supply unit;
by attaching the external propellant supply unit to the satellite, in reversible manner, by a cooperation of the anchor of the satellite and the anchor of the external propellant supply unit; and introducing the propellant for electrical propulsion into the propellant tank of the external propellant supply unit;
launching the assemblage into space, and releasing the assemblage into the initial orbit around the celestial body; and
performing the steps of the transfer method of claim 1 to transfer the assemblage from the initial orbit to the mission orbit.

16. The method as claimed in claim 15, wherein the anchor of the external propellant supply unit is releasable on a command to produce a separation of the external propellant supply unit and the satellite.

17. The method as claimed in claim 16, wherein the external propellant supply unit further comprises an electrical connector to establish an electrical connection between the external propellant supply unit and the spacecraft.

18. The method as claimed in claim 17, wherein the external propellant unit further comprises an electrical connector to establish an electrical connection between the external propellant supply unit and the spacecraft; and wherein the release of the anchor is slaved to the electrical connector such that the release of the anchor is controllable from the spacecraft.

19. The method as claimed in claim 15, wherein the anchor of the external propellant supply unit is configured to simultaneously anchor the external propellant supply unit to a plurality of satellites, said method comprising a step of anchoring a plurality of satellites to the external propellant supply unit.

* * * * *